(12) United States Patent
Tyler

(10) Patent No.: US 8,707,996 B2
(45) Date of Patent: Apr. 29, 2014

(54) SELECTOR VALVE FOR AN INTERNAL COMBUSTION ENGINE

(75) Inventor: Jeff Tyler, Newark, NY (US)

(73) Assignee: G. W. Lisk Company, Inc., Clifton Springs, NY (US)

( * ) Notice: Subject to any disclaimer, the term of this patent is extended or adjusted under 35 U.S.C. 154(b) by 156 days.

(21) Appl. No.: 13/574,726

(22) PCT Filed: Jan. 12, 2011

(86) PCT No.: PCT/US2011/020931
§ 371 (c)(1),
(2), (4) Date: Jul. 23, 2012

(87) PCT Pub. No.: WO2011/090855
PCT Pub. Date: Jul. 28, 2011

(65) Prior Publication Data
US 2012/0312402 A1    Dec. 13, 2012

Related U.S. Application Data

(60) Provisional application No. 61/297,988, filed on Jan. 25, 2010.

(51) Int. Cl.
*F16K 11/044* (2006.01)
*F16K 11/078* (2006.01)
*F16K 31/12* (2006.01)

(52) U.S. Cl.
USPC .............. 137/625.5; 137/625.4; 137/625.42; 251/48

(58) Field of Classification Search
CPC . F16K 11/044; F16K 11/048; F16K 31/0627; F02M 25/0792
USPC ............... 137/625.5, 625.4, 625.42, 630.19; 251/77, 48, 50, 53; 123/568.18, 568.2
See application file for complete search history.

(56) References Cited

U.S. PATENT DOCUMENTS

| 3,771,562 | A | * | 11/1973 | Curran ........................ 137/625.4 |
| 3,974,861 | A | | 8/1976 | Goto et al. |
| 7,854,239 | B2 | * | 12/2010 | Wears et al. ................ 137/625.4 |
| 8,474,786 | B2 | * | 7/2013 | Schneider ........................ 251/81 |
| 2007/0017489 | A1 | | 1/2007 | Kuroki et al. |
| 2007/0181106 | A1 | | 8/2007 | Koster et al. |

FOREIGN PATENT DOCUMENTS

EP    2146082 A1    1/2010

* cited by examiner

*Primary Examiner* — John Fox
*Assistant Examiner* — Michael R Reid
(74) *Attorney, Agent, or Firm* — Brown & Michaels, PC

(57) ABSTRACT

A selector valve for independently controlling fluid between a first passage, a second passage, and a common passage, comprising: a valve housing comprising an inner chamber in communication with the outlet, having a first valve seat in communication with the first inlet and a second valve seat in communication with the second inlet, a shaft slidably extending through the housing between the first and second valve seats; first and second valve poppets slidably mounted upon the shaft within the inner chamber, each having valve faces for seating against the first and second valve seats; and a spring coaxially located around the shaft between the first and second valve poppets, pushing against the inner surfaces of the first and second valve poppets, biasing the first valve poppet and the second valve poppet away from each other and toward the first valve seat and the second valve seat.

17 Claims, 7 Drawing Sheets

US 8,707,996 B2

SELECTOR VALVE FOR AN INTERNAL COMBUSTION ENGINE

REFERENCE TO RELATED APPLICATIONS

This application claims one or more inventions which were disclosed in Provisional Application No. 61/297,988, filed Jan. 25, 2010, entitled "EXHAUST GAS SELECTOR VALVE FOR AN INTERNAL COMBUSTION ENGINE". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of selector valves. More particularly, the invention pertains to an exhaust gas recirculation and exhaust gas bypass selector valve for an internal combustion engine.

2. Description of Related Art

Current technology utilizes two separate control valves: one valve to control exhaust gas from the cooler to the intake manifold and a second bypass valve to control exhaust gas from the exhaust manifold to the intake manifold bypassing the exhaust gas cooler. Current technology adds complexity to the electronic control module and requires multiple output channels to control the two independent valves.

SUMMARY OF THE INVENTION

In accordance with an embodiment is a selector valve for independently controlling fluid between a first passage, a second passage, and a common passage. The selector valve includes a valve housing comprising an inner chamber in communication with the outlet, having a first valve seat in communication with the first inlet and a second valve seat in communication with the second inlet. The first valve seat and the second valve seat are coaxially located along an axis. A shaft slidably extends through the valve housing along the axis between the first valve seat and the second valve seat. A first valve poppet is slidably mounted upon the shaft within the inner chamber, and has a valve face for seating against the first valve seat, and an inner surface and a second valve poppet is slidably mounted upon the shaft within the inner chamber, and has a valve face for seating against the second valve seat, and an inner surface. A spring is coaxially located around the shaft between the first valve poppet and the second valve poppet, pushing against the inner surface of the first valve poppet and the inner surface of the second valve poppet, biasing the first valve poppet and the second valve poppet away from each other and toward the first valve seat and the second valve seat.

When the shaft is in a central position, the spring biases the first valve poppet against the first valve seat and the second valve poppet against the second valve seat, restricting fluid flow from the first inlet and the second inlet to the outlet. When the shaft is moved in a first direction from the central position, an actuating member on the shaft contacts the valve face of the first valve poppet, moving the first valve poppet toward the second valve poppet, such that a fluid path is opened from the first inlet past the first valve seat to the outlet. When the shaft is moved in a second direction from the central position, an actuating member on the shaft contacts the valve face of the second valve poppet, moving the second valve poppet toward the first valve poppet, such that a fluid path is opened from the second inlet past the second valve seat to the outlet.

In one embodiment, the first passage and the second passage are inlet passages and the common passage is an outlet passage.

In another embodiment, the first passage and the second passage are outlet passages and the common passage is an inlet passage.

DETAILED DESCRIPTION OF THE INVENTION

Figure 1:
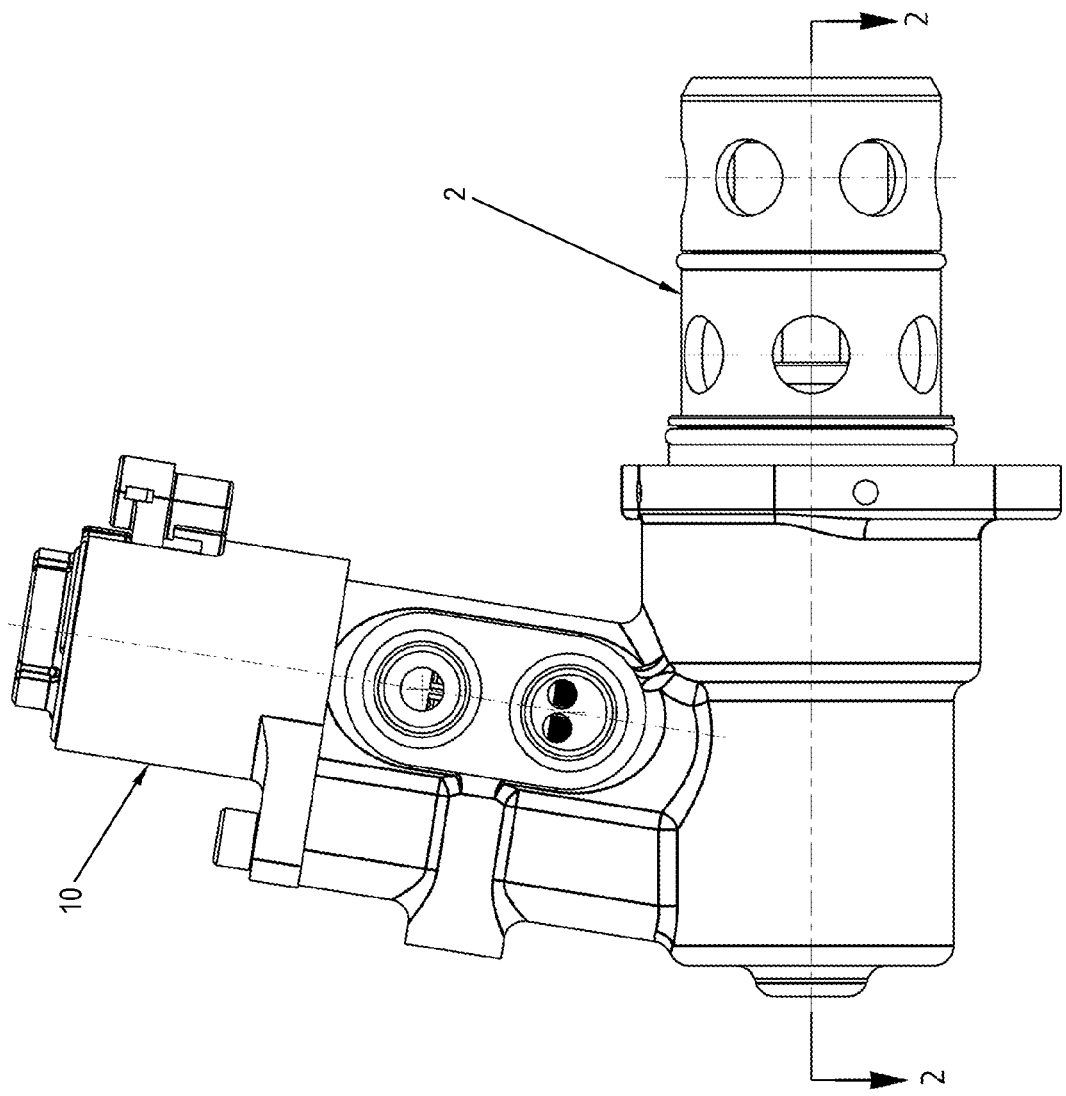
FIG. 1 shows an exhaust gas selector valve of an embodiment in the present invention.
Figure 2:
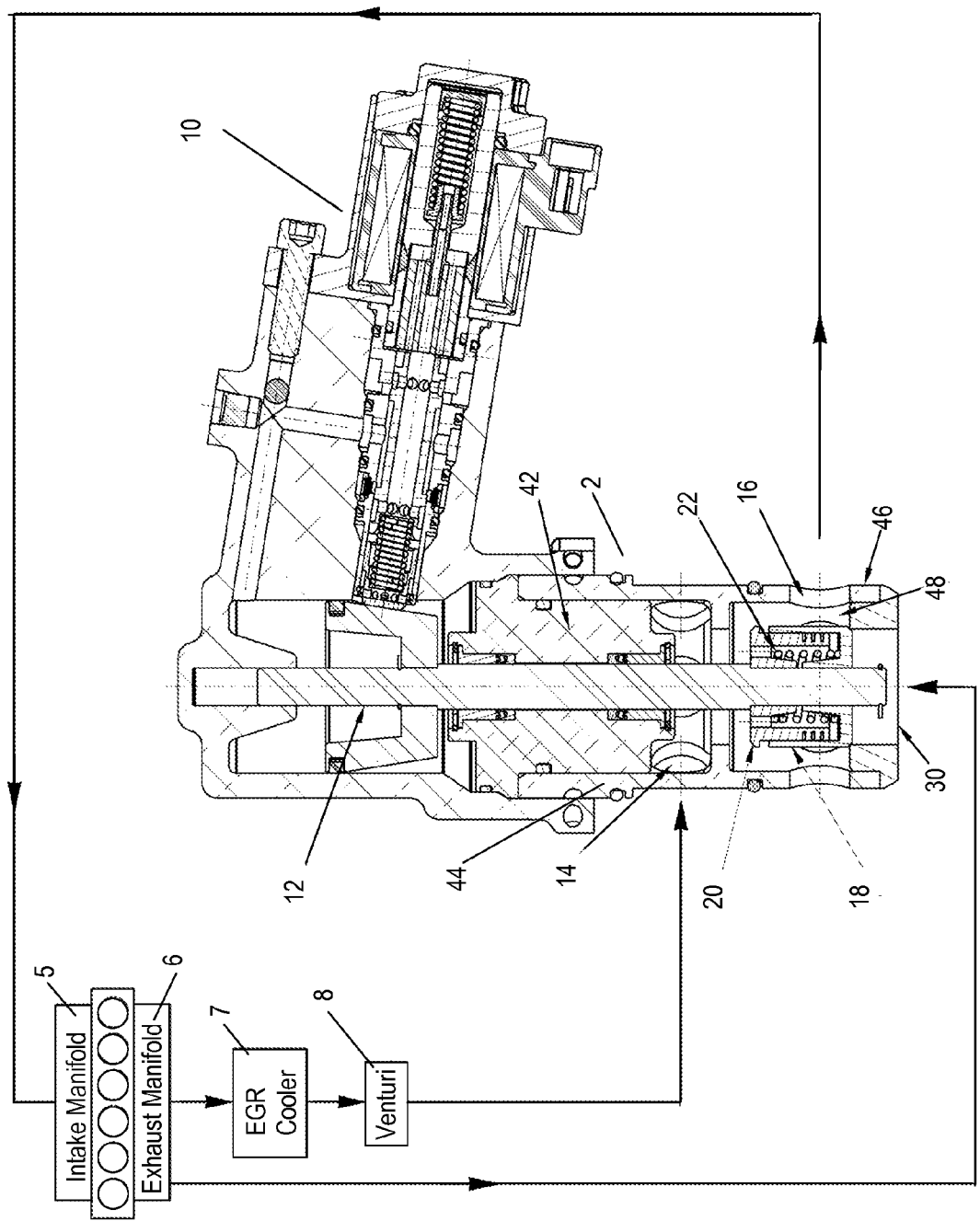
FIG. 2 shows a cross-section of FIG. 1 along line 2-2 of the exhaust gas selector valve of an embodiment of the present invention.

FIGS. 1-6 show an actuated exhaust gas selector valve 2 of an embodiment of the present invention that independently controls exhaust gas flow to a common outlet. Referring to FIG. 2, the exhaust gas selector valve 2 has a shaft 12 that extends through the valve and is actuated via actuator 10. The actuator 10 may be hydraulic as shown in FIG. 2, a pneumatic actuator, a solenoid, or an electric motor driven via a cam to linear motion, a gear transmission set to linear motion, or a combination of both, or any other device that provides linear motion. Additionally, the actuator 10 may move the shaft 12 between positions proportionally, in increments or from position to position.

The exhaust gas selector valve 2 has two inlet passages, a first inlet passage 14 allowing communication between the EGR cooler 7 and a venturi 8 in communication with the exhaust manifold 6, and a second inlet passage 30 allowing communication between the exhaust manifold 6 and the exhaust gas selector valve 2. The exhaust gas selector valve 2 has a common outlet passage 16 that is in communication with the intake manifold 5.

The valve 2 has a housing 44 with an inner diameter defining an inner chamber 48 in communication with the common outlet passage 16. The inner chamber 48 is further defined by a first valve seat 26 and a second valve seat 24. The first inlet passage 14 is in communication with the inner chamber 48 through the first valve seat 26. The second inlet passage 30 is in communication with the inner chamber 48 through second valve seat 24. The diameter 32 of the first valve seat 26 and the diameter 36 of the second valve seat 24 may be equal to each other, or one of the diameters may be smaller or larger than the other.

Within the inner chamber 48 of the exhaust gas selector valve 2 are two valve poppets 18, 20 slidably moveable, independent of each other coaxially along an axis of the shaft 12. The linear movement of the shaft actuates the poppets 18, 20 through actuating members 13, 15. The actuating members may be a retaining ring, screw, shoulder of the shaft or any other device that creates an extended feature beyond the diameter of the shaft 12.

Figure 5:
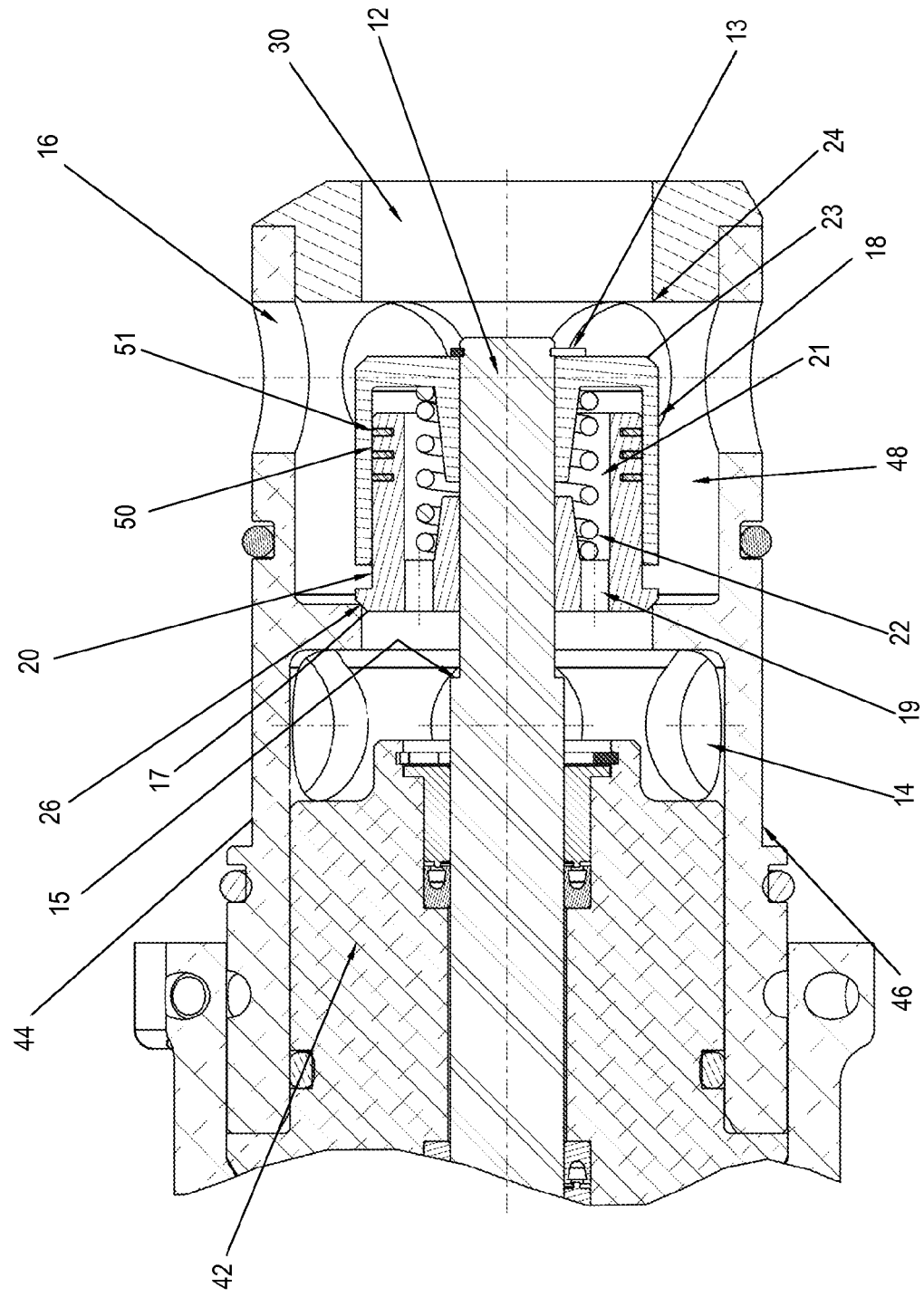
FIG. 5 shows a second position of the exhaust gas selector valve of an embodiment in the present invention.
Figure 6:
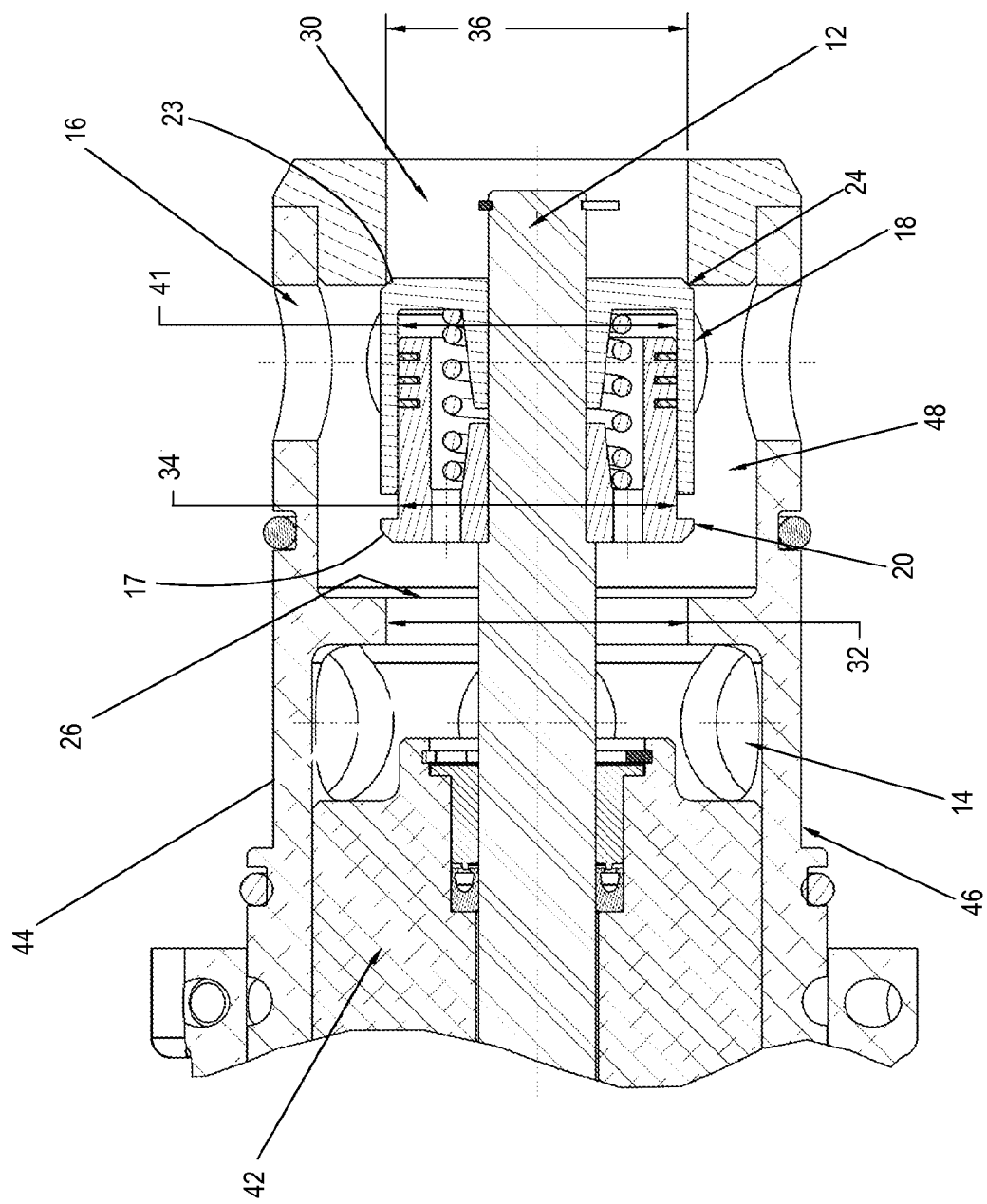
FIG. 6 shows the first position of the exhaust gas selector valve and the diameters of the valve poppets of the valve of an embodiment in the present invention.

The first valve poppet 18 is slidably received by the second valve poppet 20 such that diameters 34 and 41 of the two valve poppets 18, 20 interface 50 with each other forming and defining a pressure chamber 21 between the two valve poppets 18, 20 as shown in FIG. 6. At least one of the valve poppets 18, 20 has a pressure passage 19 to the pressure chamber 21. Within the pressure chamber 21 and between the two valve poppets 18, 20 is a spring 22 biasing the two valve poppets 18, 20 apart and towards their respective valve seats 24, 26, in other words, the spring 22 biases a first valve face 17 of the first valve poppet 20 towards the first valve seat 26 and a second valve face 23 of the second valve poppet 18 towards the second valve seat 24. The pressure chamber formed 21 between the two valve poppets reduces the spring force required for spring 22 to maintain positioning of the poppet valves 18, 20. The pressure chamber 21 also reduces the force in which the actuator 10 needs to pull or push shaft 12 to linearly move or actuate the poppet valves 18, 20, and reduces pressure forces present on the valve poppets 18, 20. The cross-sectional areas of each of the pressure chamber 21 formed between the inner surfaces of the valve poppets 18, 20 may be smaller, equal to, or larger than the diameters/areas 32, 36 of the first and second valve seats 26, 24. In FIGS. 2-6, the first valve poppet 20 is shown as being slidably received within the second valve poppet 18, but the second valve poppet 18 could be slidably received by the first valve poppet 20.

A piston ring or seal 51 may be present at the interface 50 between the two valve poppets 18, 20, for example between diameter 34 of the first valve poppet 20 and the inner diameter 41 of the second valve poppet 18 to reduce the leak path between the pressure chamber 21 formed between the two valve poppets 18, 20 and the inner chamber 48 to the common outlet 16, exiting the exhaust gas selector valve 2.

When the first valve face 17 of the first poppet 20 seats on the first valve seat 26, the first inlet passage 14 is sealed off from the inner chamber 48 of the exhaust gas selector valve 2 and any exhaust gas that passes through the EGR cooler 7 and the first inlet passage 14 is prevented from mixing with the exhaust gas from the second inlet passage 30 and flowing out the common outlet passage 16. When the second valve face 23 of the second poppet 18 seats on the second valve seat 24, exhaust gas from the second inlet passage 30 is sealed off from or prevented from entering the inner chamber 48 of the exhaust gas selector valve 2 and flowing out the common outlet passage 16.

Figure 3:
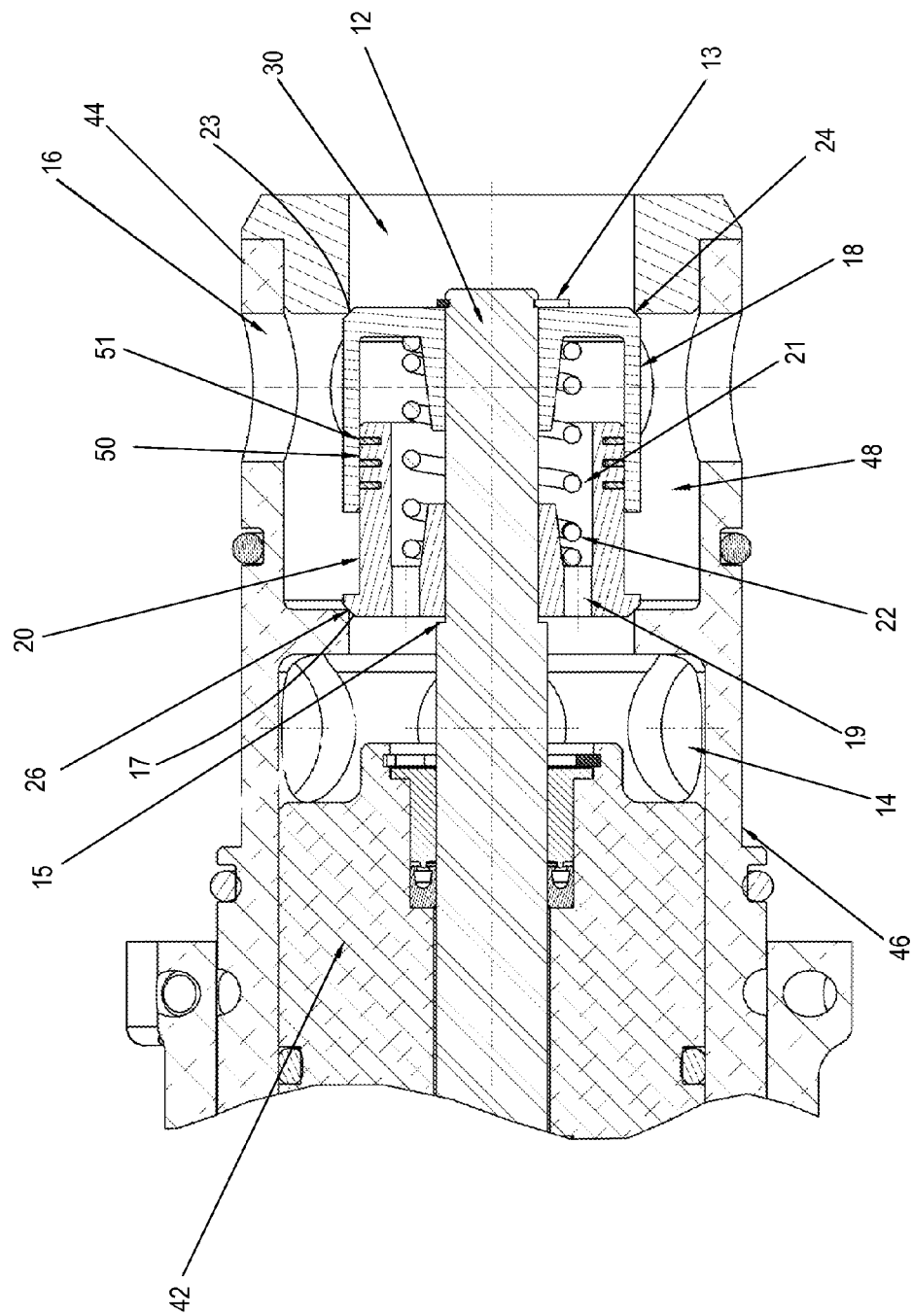
FIG. 3 shows a central position of the exhaust gas selector valve of an embodiment in the present invention.

FIG. 3 shows the exhaust gas selector valve 2 in a central position in which any exhaust gas from the first inlet passage 14 or the second inlet passage 30 is restricted from exiting the common outlet 16. The actuator 10 actuates the shaft 12 to a central position in which the spring 22 biases the first valve face 17 of the first valve poppet 20 to seat against the first valve seat 26 and the second valve face 23 of the second valve poppet 18 to seat against the second valve seat 24, restricting the flow of gas through the common outlet 16. Exhaust gas that has passed through the EGR cooler 7 and into the first inlet passage 14 enters the pressure passage 19 in the first valve poppet 20 to aid in maintaining the seats of the valve poppets 20, 18 on the first valve seat 26 and the second valve seat 24 by reducing pressure biasing forces acting on the valve poppets 18, 20.

Figure 4:
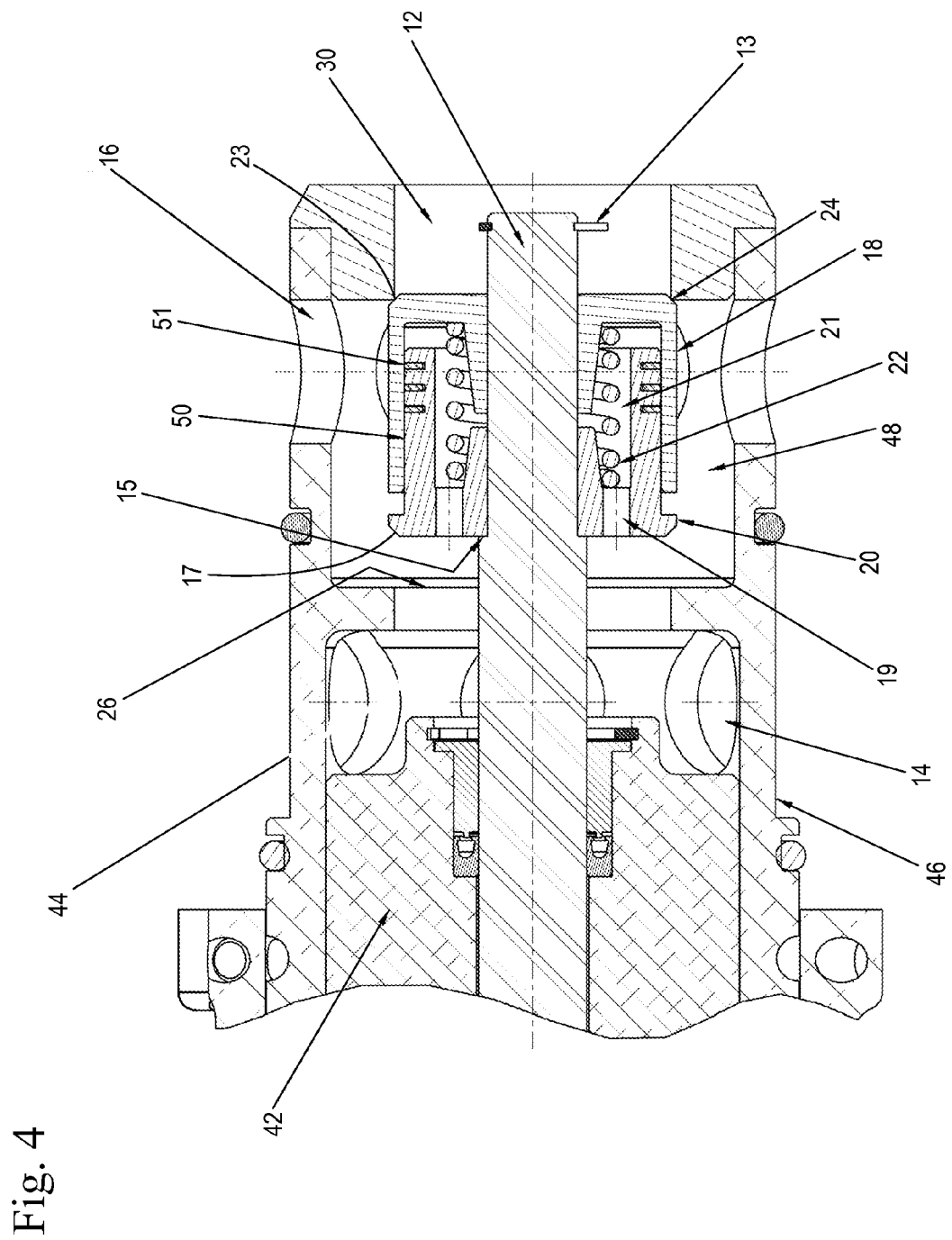
FIG. 4 shows a first position of the exhaust gas selector valve of an embodiment in the present invention.

FIG. 4 shows the exhaust gas selector valve 2 in a first position in which the second valve face 23 of the second valve poppet 18 contacts the second valve seat 24, restricting any gas from the exhaust manifold 6 and from the second inlet passage 30 from entering the exhaust gas selector valve 2. To move towards the first position, the actuator 10 actuates the shaft 12 towards the second inlet passage 30. The movement of the shaft 12 towards the second inlet passage 30 actuates the actuating member or shoulder of the shaft 15 to actuate the first valve poppet 20, moving the first valve poppet 20 towards the second valve poppet 18. The movement of the first valve poppet 20 towards the second valve poppet 18 compresses the spring 22 between the first and second valve poppets 20, 18. With the second valve face 23 of the second valve poppet 18 seating on the second valve seat 24, exhaust gas that has passed through the EGR cooler 7 and into the first inlet passage 14 passes through the first valve seat 26 of exhaust gas selector valve 2 to the inner chamber 48 of the exhaust gas selector valve 2 and out the common outlet 16 leading to the intake manifold 5. Exhaust gas that has passed through the EGR cooler 7 and into the first inlet passage 14 enters the pressure passage 19 in the first valve poppet 20 to aid in maintaining the seat of the second valve poppet 18 on the second valve seat 24 by reducing pressure biasing forces acting on the valve poppets 18, 20.

FIG. 5 shows the exhaust gas selector valve 2 in a second position in which the first valve face 17 of the first valve poppet 20 contacts the first valve seat 26, restricting any exhaust gas that has passed through the EGR cooler 7 and into the first inlet passage 14 from exiting the exhaust gas selector valve 2 through the common outlet 16. To move towards the second position, the actuator 10 actuates the shaft 12 towards the first inlet passage 14. The movement of the shaft 12 towards the first inlet passage 14 actuates the actuating member 13 to actuate the second valve poppet 18, moving the second valve poppet 18 towards the first valve poppet 20. The movement of the second valve poppet 18 towards the first valve poppet 20 compresses spring 22 between the first and second valve poppets 20, 18. With the first valve face 17 of the first valve poppet 20 seated on the first valve seat 26, hot exhaust gas, or gas straight from the exhaust manifold 6 from the second inlet passage 30 passes into the inner chamber 48 of the exhaust gas selector valve 2 and out the common outlet 16 leading to the intake manifold 5. Exhaust gas that has passed through the EGR cooler 7 enters the pressure passage 19 in the first valve poppet 20 to aid in maintaining the seating of the first valve poppet 20 on the first valve seat 26 by reducing pressure biasing forces acting on the poppets 18, 20.

In an alternate embodiment, the input of the first inlet passage 14 and the input of the second inlet passage 30 may be switched, so that the input of the first inlet passage 14 would be exhaust gas directly from the exhaust manifold 6 and the input of the second inlet passage 30 would be exhaust gas that has passed through the EGR cooler 7 and venturi 8.

Figure 7:
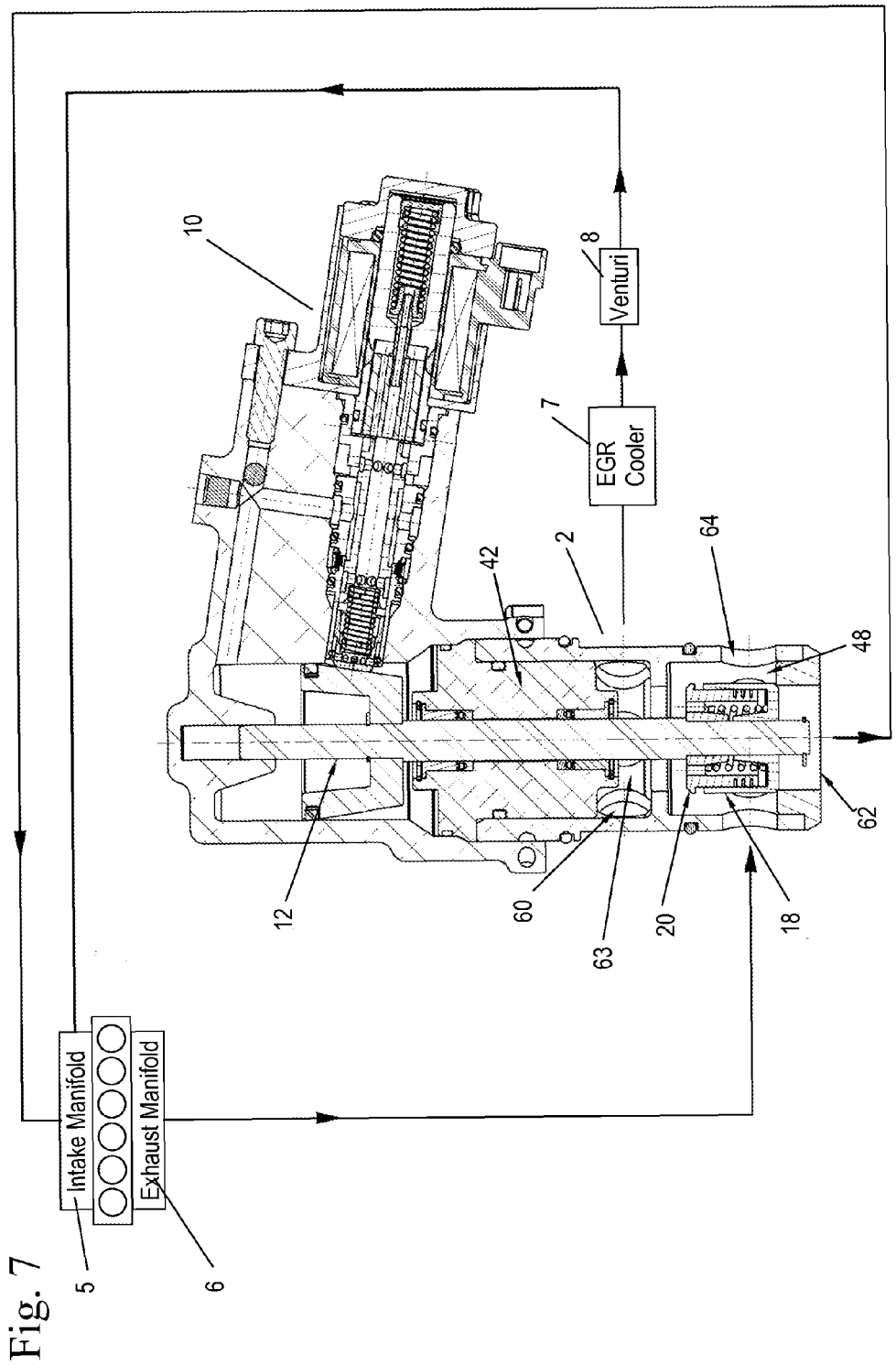
FIG. 7 shows an alternate embodiment of the exhaust gas selector valve of the present invention.

In another alternate embodiment, the selector valve has an inlet passage 64 and two outlet passages 60, 62, with a first outlet passage 60 from a chamber 63 defined within the valve housing 44 between a plug 42 and the first valve seat of the exhaust gas selector valve 2 and a second outlet passage 62 from the inner chamber 48 of the exhaust gas selector valve 2. The exhaust gas selector valve 2 would be mounted upstream of the EGR cooler 7 and venturi 8 as shown in FIG. 7. Exhaust gas from the exhaust manifold 6 can be directed to the inlet of the EGR cooler 7 from the first outlet passage 60 or directly to the intake manifold 5 from the second outlet passage 62.

When the selector valve 2 is in a central position, gas from the inlet passage 64 would be restricted from exiting the valve through the first outlet passage 60 and the second outlet passage 62. The actuator 10 actuates the shaft 12 to a central position in which the spring 22 biases the first valve face 17 of the first valve poppet 20 to seat against the first valve seat 26 and the second valve face 23 of the second valve poppet 18 to seat against the second valve seat 24, restricting the flow of gas from the inlet passage 64 through the two outlet passages 60, 62. Gas from the intake manifold 5 from outlet passage 60 enters the pressure passage 19 in the first valve poppet 20 and may aid in maintaining the seats of the valve poppets 20, 18 on the first valve seat 26 and the second valve seat 24 by reducing pressure biasing forces acting on the valve poppets 18, 20.

When the selector valve 2 is in a first position in which the second valve face 23 of the second valve poppet 18 contacts the second valve seat 24, as shown in FIG. 7, any gas from inlet passage 64 is restricted from exiting the second outlet passage 62 and instead exits the valve through the first valve seat 26 and from the first outlet passage 60. To move towards the first position, the actuator 10 actuates the shaft 12 towards the second outlet passage 62. The movement of the shaft 12 towards the second outlet passage 62 actuates the actuating member or shoulder of the shaft 15 to actuate the first valve poppet 20, moving the first valve poppet 20 towards the second valve poppet 18. The movement of the first valve poppet 20 towards the second valve poppet 18 compresses the spring 22 between the first and second valve poppets 20, 18. With the second valve face 23 of the second valve poppet 18 seating on the second valve seat 24, exhaust gas from the exhaust gas manifold 6 and into the inlet passage 64 passes through the first valve seat 26 of exhaust gas selector valve 2 and out the first outlet 60 passage leading to the intake manifold 5. Exhaust gas from the inlet passage 64 also enters the pressure passage 19 in the first valve poppet 20 to aid in maintaining the seat of the second valve poppet 18 on the second valve seat 24 by reducing pressure biasing forces acting on the valve poppets 18, 20.

When the selector valve 2 in a second position in which the first valve face 17 of the first valve poppet 20 contacts the first valve seat 26, any gas from inlet passage 64 is restricted from exiting the first outlet passage 60 and instead exits through the valve through the second valve seat 24 and from the second outlet 62. To move towards the second position, the actuator 10 actuates the shaft 12 towards the first outlet passage 60. The movement of the shaft 12 towards the first outlet passage 60 actuates the actuating member 13 to actuate the second valve poppet 18, moving the second valve poppet 18 towards the first valve poppet 20. The movement of the second valve poppet 18 towards the first valve poppet 20 compresses spring 22 between the first and second valve poppets 20, 18. With the first valve face 17 of the first valve poppet 20 seated on the first valve seat 26, hot exhaust gas, or gas straight from the exhaust manifold 6 from the inlet passage 64 passes into the inner chamber 48 of the exhaust gas selector valve 2 and out the second outlet passage 62 leading to the intake manifold 5. Exhaust gas from the inlet passage 64 also enters the pressure passage 19 in the first valve poppet 20 to aid in maintaining the seat of the second valve poppet 18 on the second valve seat 24 by reducing pressure biasing forces acting on the valve poppets 18, 20.

It should be noted that while the valve is discussed in terms of selecting a gas, a person skilled in the art would be able to use the valve with a fluid.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A selector valve for independently controlling fluid between a first passage, a second passage, and a common passage, comprising:
    a valve housing comprising an inner chamber in communication with the common passage, having a first valve seat in communication with the first passage and a second valve seat in communication with the second passage, the first valve seat and the second valve seat being coaxially located along an axis;
    a shaft slidably extending through the valve housing along the axis between the first valve seat and the second valve seat;
    a first valve poppet slidably mounted upon the shaft within the inner chamber, having a valve face for seating against the first valve seat, and an inner surface;
    a second valve poppet slidably mounted upon the shaft within the inner chamber, having a valve face for seating against the second valve seat, and an inner surface;
    wherein one of the first valve poppet or the second valve poppet slidably receives the other of the first valve poppet or the second valve poppet and the inner surface of the first valve poppet and the inner surface of the second valve poppet define a pressure chamber; and
    a spring coaxially located around the shaft between the first valve poppet and the second valve poppet, pushing against the inner surface of the first valve poppet and the inner surface of the second valve poppet, biasing the first valve poppet and the second valve poppet away from each other and toward the first valve seat and the second valve seat;
    wherein:
        when the shaft is in a central position, the spring biases the first valve poppet against the first valve seat and the second valve poppet against the second valve seat, restricting fluid flow between the first passage, the second passage and the common passage through first valve seat and the second valve seat,
        when the shaft is moved in a first direction from the central position, an actuating member on the shaft contacts the valve face of the first valve poppet, moving the first valve poppet toward the second valve poppet, such that a fluid path is opened between the first passage and the common passage through the first valve seat, and
        when the shaft is moved in a second direction from the central position, an actuating member on the shaft contacts the valve face of the second valve poppet, moving the second valve poppet toward the first valve poppet, such that a fluid path is opened between the second passage and the common passage through the second valve seat.

2. The valve of claim 1, wherein the actuating member is a shoulder formed on the shaft.

3. The valve of claim 1, wherein the actuating member is a retaining clip or retaining screw on the shaft.

4. The valve of claim 1, wherein a diameter of the first valve seat is less than a diameter of the second valve seat.

5. The valve of claim 1, wherein a diameter of the first valve seat is greater than a diameter of the second valve seat.

6. The valve of claim 1, further comprising an actuator coupled to the shaft.

7. The valve of claim 1, further comprising a passage extending from the pressure chamber to the inner chamber through the first valve poppet or the second valve poppet.

8. The valve of claim 7, wherein the passage is in communication with the first passage, such that pressure from the first passage biases the second valve poppet against the second valve seat.

9. The valve of claim 7, wherein the passage is in communication with the second passage, such that the pressure from the second passage biases the first valve poppet against the first valve seat.

10. The valve of claim 7, wherein the passage is in communication with the common passage, such that pressure from the common passage biases the first valve poppet against the first valve seat or the second valve poppet against the second valve seat.

11. The valve of claim 1, wherein an area of the pressure chamber is greater than a diameter of the first valve seat and the second valve seat.

12. The valve of claim 1, wherein an area of the pressure chamber is less than a diameter of the first valve seat and the second valve seat.

13. The valve of claim 1, wherein an area of the pressure chamber is equal to the diameter of the first valve seat and the second valve seat.

14. The valve of claim 1, further comprising a seal between the first valve poppet and the second valve poppet for restricting flow of fluid out of the pressure chamber.

15. The valve of claim 1, wherein the fluid is a gas.

16. The valve of claim 1, wherein the first passage and the second passage are inlet passages and the common passage is an outlet passage.

17. The valve of claim 1, wherein the first passage and the second passage are outlet passages and the common passage is an inlet passage.

* * * * *